US012253253B2

(12) United States Patent
Huang

(10) Patent No.: US 12,253,253 B2
(45) Date of Patent: Mar. 18, 2025

(54) FAN LAMP

(71) Applicant: Qinghua Huang, Nanchong (CN)

(72) Inventor: Qinghua Huang, Nanchong (CN)

( * ) Notice: Subject to any disclaimer, the term of this patent is extended or adjusted under 35 U.S.C. 154(b) by 0 days.

(21) Appl. No.: 18/420,839

(22) Filed: Jan. 24, 2024

(65) Prior Publication Data

US 2024/0230081 A1 Jul. 11, 2024

(51) Int. Cl.

*F21V 33/00* (2006.01)
*F21V 17/12* (2006.01)
*F21V 17/14* (2006.01)
*F21V 23/00* (2015.01)
*F21Y 103/33* (2016.01)
*F21Y 115/10* (2016.01)

(52) U.S. Cl.

CPC .......... *F21V 33/0096* (2013.01); *F21V 17/12* (2013.01); *F21V 17/14* (2013.01); *F21V 23/002* (2013.01); *F21Y 2103/33* (2016.08); *F21Y 2115/10* (2016.08)

(58) Field of Classification Search

CPC ...... F21V 33/0096; F21V 17/12; F21V 17/14; F21V 23/002; F21Y 2103/33; F21Y 2115/10

See application file for complete search history.

(56) References Cited

FOREIGN PATENT DOCUMENTS

CN 207377829 U * 5/2018

OTHER PUBLICATIONS

CN 207377829 U machine translation (Year: 2018).*

* cited by examiner

*Primary Examiner* — Anne M Hines
*Assistant Examiner* — Jose M Diaz
(74) *Attorney, Agent, or Firm* — Daniel M. Cohn; Howard M. Cohn

(57) ABSTRACT

The present invention relates to the field of indoor electrical appliances, and in particular to a fan lamp, including a lamp head assembly, a lampshade, a PCB controller, a brushless motor fan and a filament assembly. In the present application, a fan, light and a light-transmitting lampshade are combined to provide a multifunctional usage scenario suitable for different needs; and the entire device becomes more compact by installing a PCB controller and a brushless motor fan in the center of the lampshade. Meanwhile, by disposing the PCB controller in an installation part, the overall structure is more integrated, and the exposure of external connecting wires is reduced.

9 Claims, 7 Drawing Sheets

FAN LAMP

TECHNICAL FIELD

The present invention relates to the field of indoor electrical appliances, and in particular to a fan lamp.

BACKGROUND

A fan lamp is a commonly used household appliance and a combination device of a fan and a lamp, so that the fan lamp has the function of both the lamp and the fan. Existing fan lamps usually stack lamps directly on the basis of traditional fans, resulting in uneven illumination, and there is no special area for placing a lamp control board, resulting in exposed wires which do not look tidy enough. Meanwhile, the overall size in the prior art is large, and the required layout space is large. In addition, due to a large optical cavity of traditional lamps, the overall appearance of the fan lamp is relatively bloated, which affects the user experience.

SUMMARY

In order to solve the above problems, the present invention provides a fan lamp. The design in the present application that combines a fan, light and a light-transmitting lampshade provides a multifunctional usage scenario suitable for different needs.

In order to achieve the above objects, the technical solution adopted by the present invention is: a fan lamp includes a lamp head assembly, a lampshade, a PCB controller, a brushless motor fan and a filament assembly, where a top center of the lampshade is provided with an installation part, the PCB controller is built into the installation part, one end of the lamp head assembly is assembled on the installation part, the PCB controller is electrically connected to the lamp head assembly, meanwhile, the brushless motor fan is installed at a bottom of the installation part and is electrically connected to the PCB controller, and the filament assembly is assembled at an edge of a bottom and is electrically connected to the PCB controller.

As a further optimization solution, the lampshade is a light-transmitting lampshade, and the light-transmitting lampshade includes a lampshade body and the installation part which is located at a top center of the lampshade body, where a plurality of air inlets are formed in an outer side of the lampshade body, and the filament assembly is assembled at an edge of a bottom end of the lampshade body.

As a further optimization solution, the filament assembly includes an LED filament and an LED lamp fixing ring, where the LED lamp fixing ring is provided with an LED lamp trough, the LED filament is assembled in the LED lamp trough, and the LED lamp fixing ring is detachably assembled at the edge of the bottom end of the lampshade body.

As a further optimization solution, an inner wall of the bottom end of the lampshade body is provided with a plurality of latching protrusions, where the LED lamp fixing ring is assembled with the lampshade body through the latching protrusions.

As a further optimization solution, the LED lamp fixing ring is provided with a wiring notch connected to the LED lamp trough, and the inner wall of the lampshade body is further provided with a wiring trough, one end of the wiring trough is connected to the wiring notch, and the other end thereof extends to the installation part.

As a further optimization solution, the lamp head assembly includes a lamp head, an upper cover, and an inner cover, where the upper cover includes a threaded head and an assembling part, where the lamp head is screwed to the threaded head, a bottom of the assembling part is provided with a plurality of buckles, a top of the inner cover is provided with a bayonet, and the assembly of the upper cover and the inner cover is achieved through the buckles and the bayonet.

As a further optimization solution, the bottom of the assembling part is further provided with a plurality of positioning feet, the top of the inner cover is provided with positioning holes aligned with the positioning feet, and the positioning feet are inserted into the corresponding positioning holes.

As a further optimization solution, the installation part includes a first installation part and a second installation part that are connected in sequence from top to bottom, where a plurality of first installation posts are disposed in the first installation part, a plurality of second installation posts are disposed at a bottom of the inner cover, the second installation posts are docked with the first installation posts, a surface of the inner cover is provided with screw holes aligned with the second installation posts, and screws pass through the second installation posts and the first installation posts in sequence to achieve the assembly of both.

As a further optimization solution, the second installation part is further provided with motor positioning holes internally, where the brushless motor fan includes a brushless motor and fan blades, where a driving end of the brushless motor is connected to the fan blades, and a tail of the brushless motor is further provided with a third installation post, and where screws pass through the motor positioning holes and the third installation post in sequence to achieve the assembly of both.

As a further optimization solution, a side wall of the first installation part is provided with a first wire passing hole aligned with the wiring trough, and a side wall of the inner cover is also provided with a wire passing notch aligned with the first wire passing hole.

As a further optimization solution, a bottom of the second installation part is provided with a second wire passing hole, and the second wire passing hole is used for electric connection between the brushless motor and the PCB controller.

As a further optimization solution, the periphery of the second installation part is connected to a reinforcing sleeve through reinforcing ribs.

The beneficial effects of the present invention lie in: the design in the present application that combines a fan, light and a light-transmitting lampshade provides a multifunctional usage scenario suitable for different needs, such as providing lighting, ventilation or an environment that takes both into account. At the same time, by installing the PCB controller and brushless motor fan in the center of the lampshade, space is effectively utilized and the entire device is more compact. Meanwhile, the PCB controller is built into the installation part, making the overall structure more integrated, reducing the exposure of external connecting wires, thereby improving the overall cleanliness of the appearance. In addition, the filament assembly is installed at the edge of the bottom end of the lampshade, such that a more uniform lighting effect is provided, and the overall appearance will not appear bloated.

Figure 1:
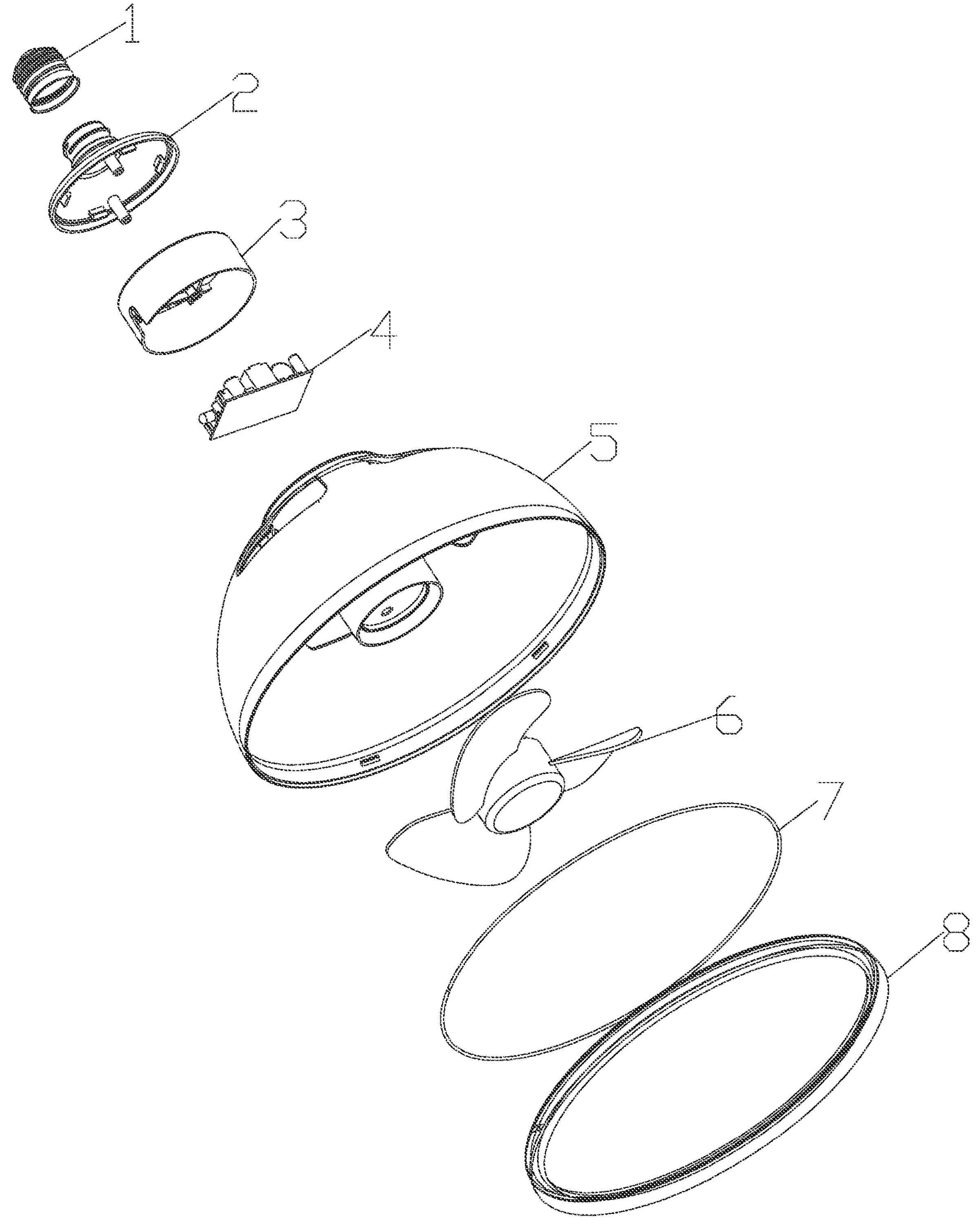
FIG. 1 is an exploded structural view of a fan lamp.

Explanation of reference numerals: lamp head 1, upper cover 2, threaded head 21, assembling part 22, buckle 221, positioning foot 222, inner cover 3, bayonet 31, second installation post 32, positioning hole 33, wire passing notch 34, PCB controller 4, lampshade 5, brushless motor fan 6, LED filament 7, LED lamp fixing ring 8, wiring notch 81, lampshade body 51, air inlet 511, first installation part 52, first installation post 521, first wire passing hole 522, second installation part 53, reinforcing sleeve 54, wiring trough 55, latching protrusion 512, motor positioning hole 531, and second wire passing hole 532.

DETAILED DESCRIPTION OF EMBODIMENTS

Figure 2:
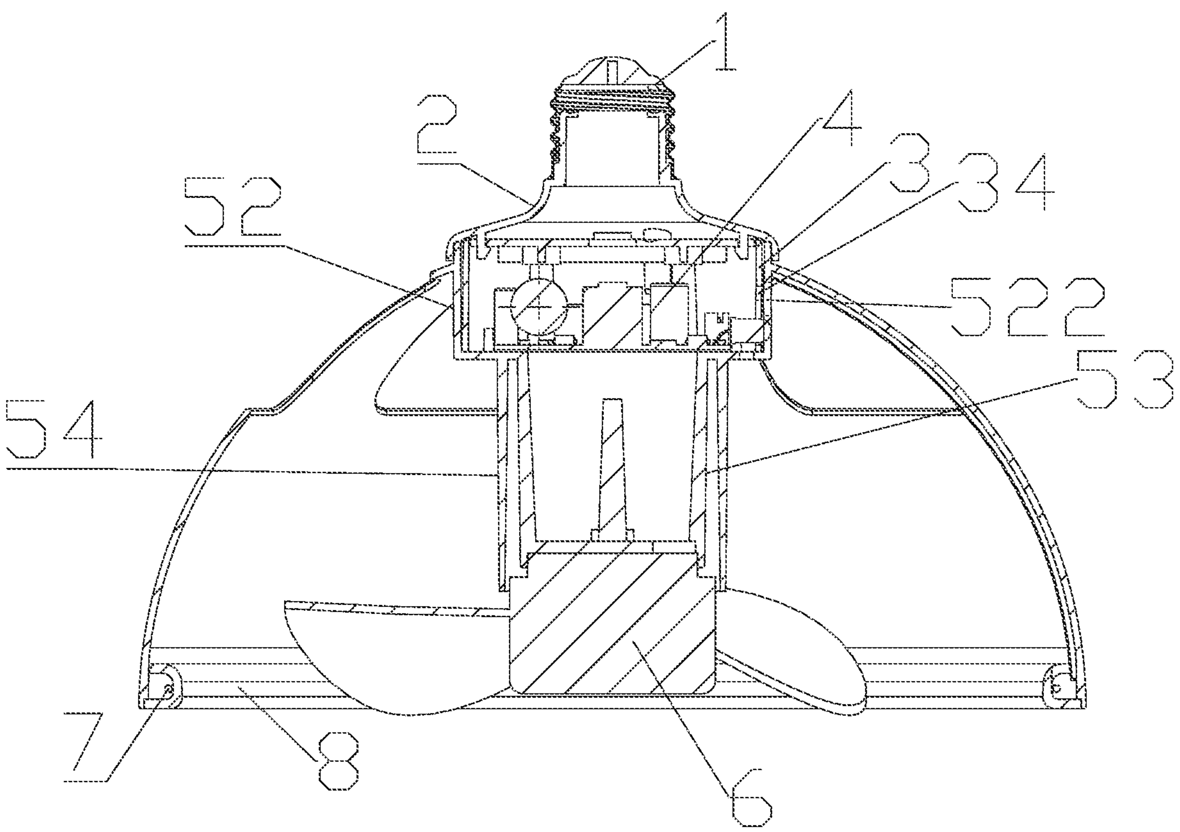
FIG. 2 is a schematic cross-sectional structural diagram of the fan lamp.
Figure 3:
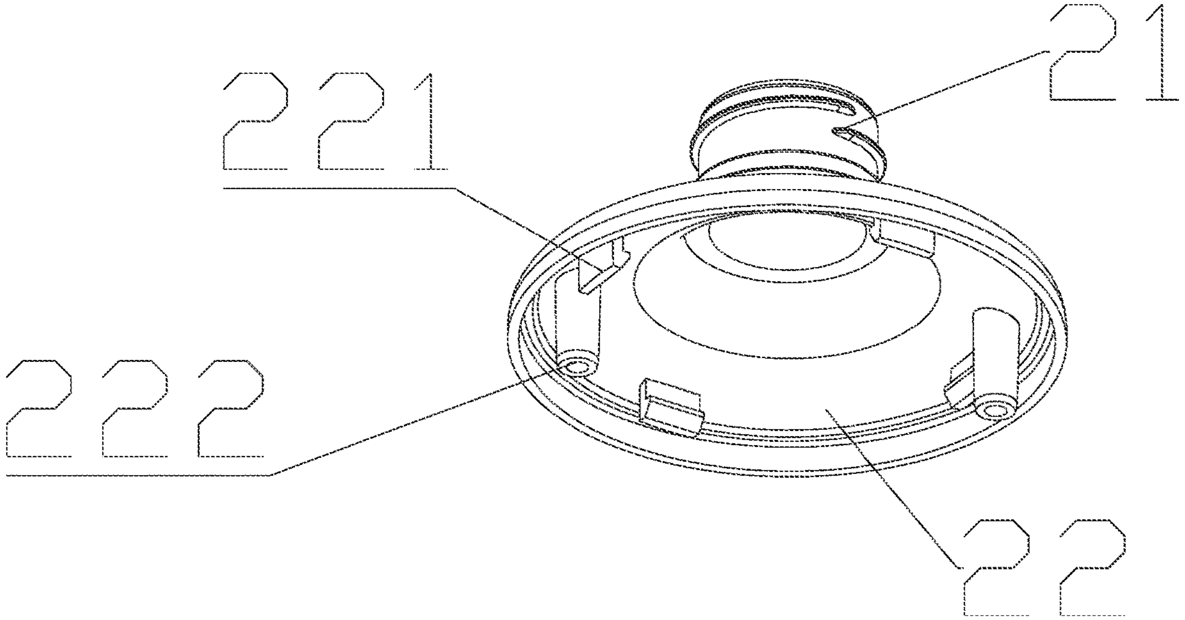
FIG. 3 is a schematic structural diagram of an upper cover.
Figure 4:
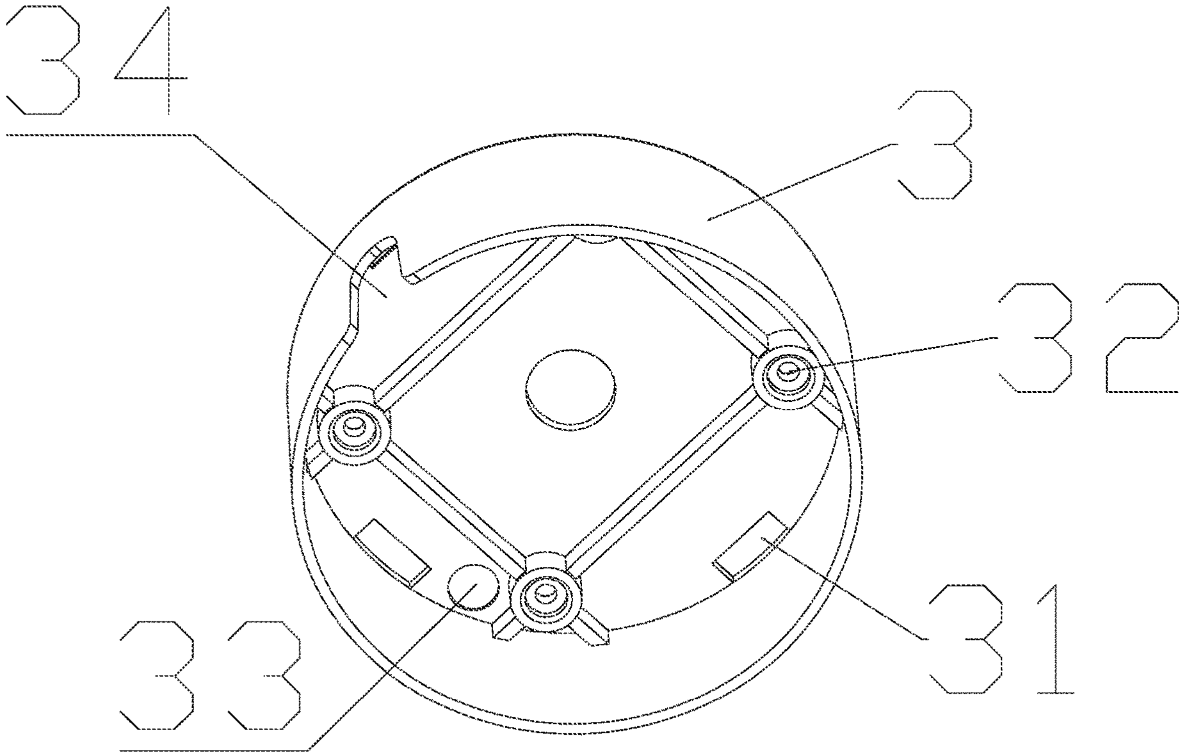
FIG. 4 is a schematic structural diagram of an inner cover.
Figure 5:
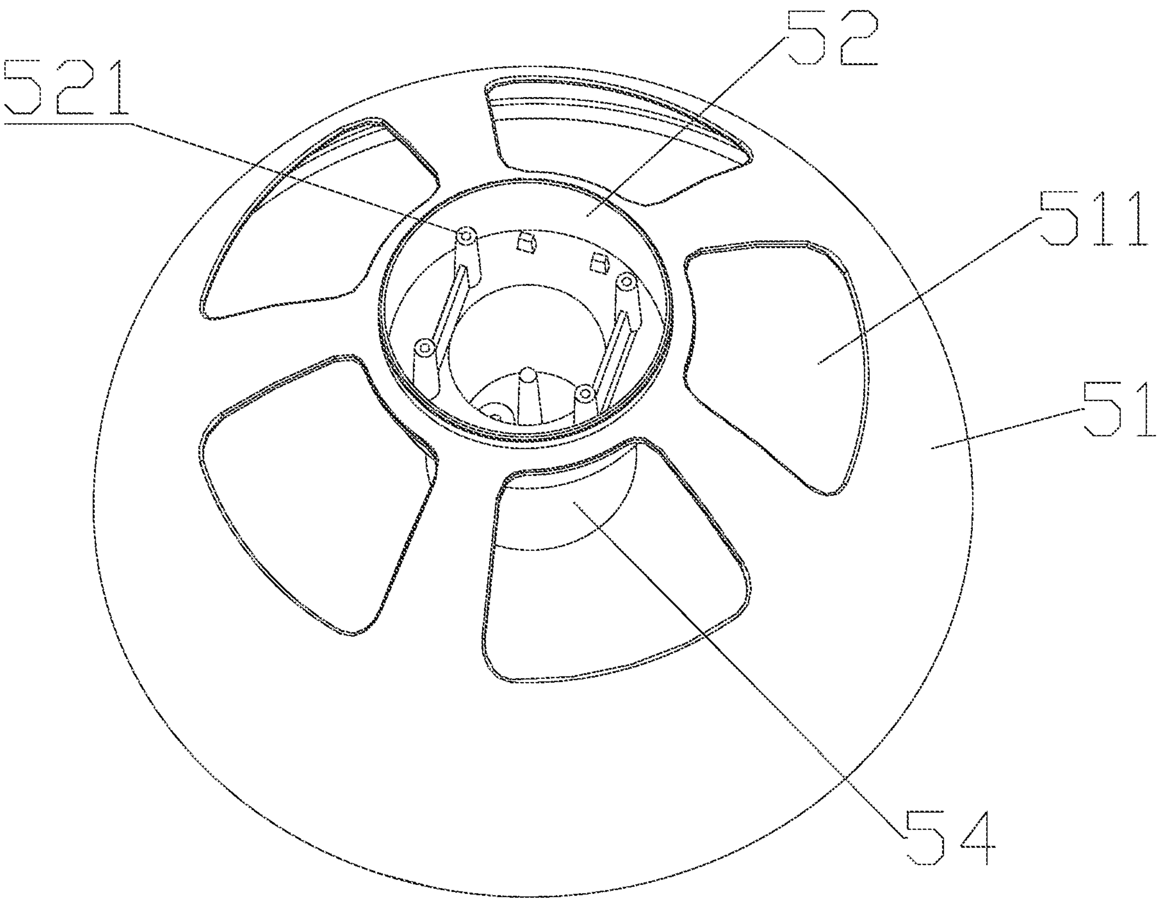
FIG. 5 is a schematic structural diagram of a lampshade from a top perspective.
Figure 6:
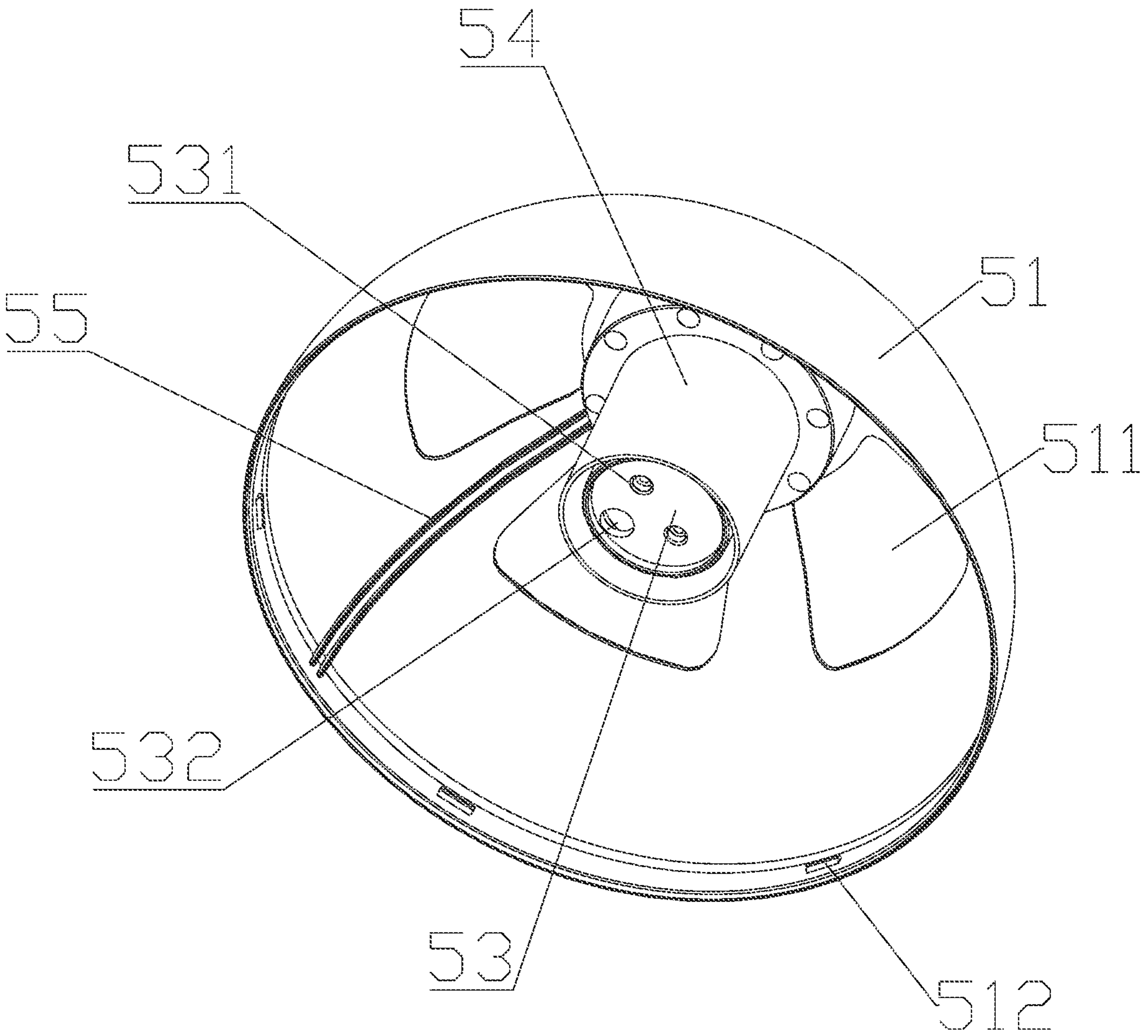
FIG. 6 is a schematic structural diagram of the lampshade from a bottom perspective.
Figure 7:
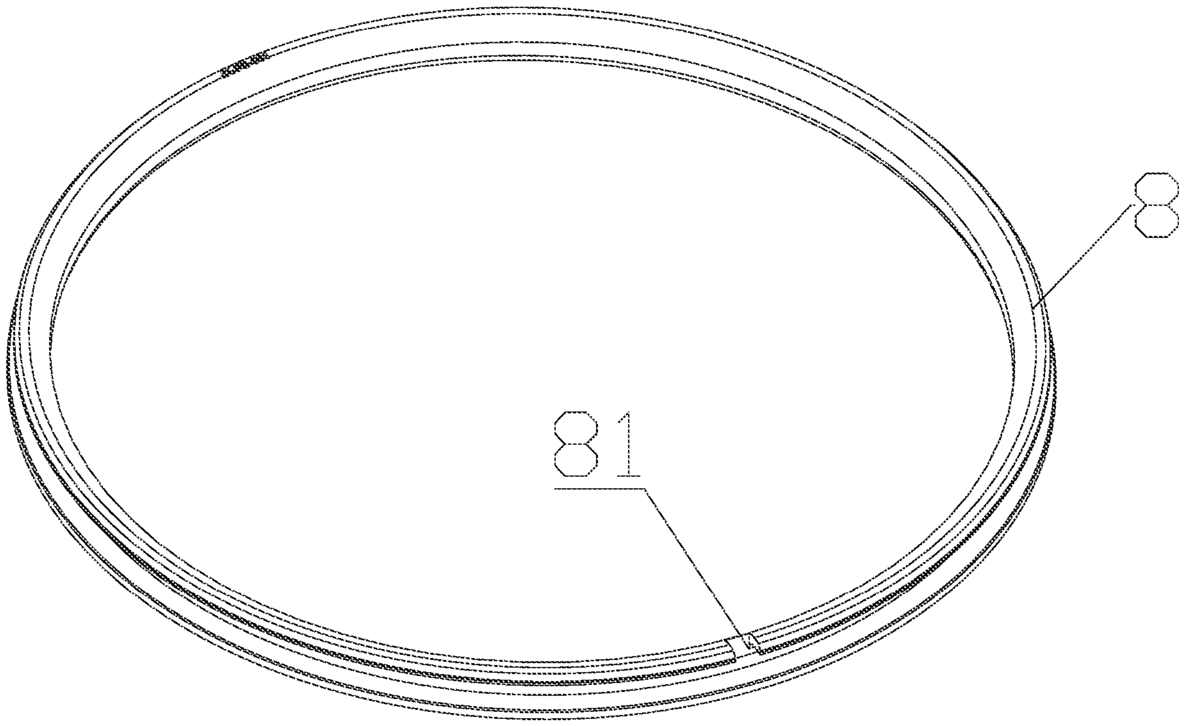
FIG. 7 is a schematic structural diagram of an LED lamp fixing ring.

Please referring to FIGS. 1-7, the present invention relates to a fan lamp, including a lamp head assembly, a lampshade 5, a PCB controller 4, a brushless motor fan 6 and a filament assembly. A top of the lampshade 5 is provided with an installation part, and the PCB controller 4 is built into the installation part. One end of the lamp head assembly is assembled on the installation part, the PCB controller 4 is electrically connected to the lamp head assembly, and meanwhile, the brushless motor fan 6 is installed at a bottom of the installation part and is electrically connected to the PCB controller 4. The filament assembly is assembled at an edge of a bottom and is electrically connected to the PCB controller 4.

The design in the present application that combines a fan, light and a light-transmitting lampshade 5 provides a multifunctional usage scenario suitable for different needs, such as providing lighting, ventilation or an environment that takes both into account. At the same time, by installing the PCB controller 4 and the brushless motor fan 6 in the center of the lampshade 5, space is effectively utilized and the entire device is more compact. Meanwhile, the PCB controller 4 is built into the installation part, making the overall structure more integrated, reducing the exposure of external connecting wires, thereby improving the overall cleanliness of the appearance. In addition, the filament assembly is installed at an edge of a bottom end of the lampshade 5, such that a more uniform lighting effect is provided.

As a further optimization solution, the lampshade 5 is a light-transmitting lampshade 5, and the light-transmitting lampshade 5 includes a lampshade 5 body and the installation part which is located at a top center of the lampshade 5 body. A plurality of air inlets 511 are formed in an outer side of the lampshade 5 body, and the filament assembly is assembled at an edge of a bottom end of the lampshade 5 body.

In a further optimization solution, a plurality of air inlets 511 are cleverly provided on the outer side of the lampshade 5 body, which not only provides a more sufficient air supply for the brushless motor fan 6, but also enhances the overall ventilation effect. This design, under the dual functions of lighting and ventilation, can better adapt to the needs of different environments and seasons, providing a more comprehensive user experience. In addition, the edge of the bottom end of the light-transmitting lampshade 5 becomes an ideal installation location for the filament assembly. Installing the filament assembly in this location helps achieve a more even and softer lighting effect. The light emanates from the edge of the bottom to reduce the glare caused by direct light and reduce possible shadows at the same time, making the lighting more comfortable and warmer.

As a further optimization solution, the filament assembly includes an LED filament 7 and an LED lamp fixing ring 8. The LED lamp fixing ring 8 is provided with an LED lamp trough, the LED filament 7 is assembled in the LED lamp trough, and the LED lamp fixing ring 8 is detachably assembled at the edge of the bottom end of the lampshade 5 body. The detachable LED lamp fixing ring 8 makes the filament assembly easier to install and maintain. A user can easily disassemble the LED lamp fixing ring 8 to facilitate replacement or repair of the LED filament 7 without having to disassemble the entire lampshade 5, which improves the maintainability and flexibility of the product. Secondly, the design of the LED lamp trough on the LED lamp fixing ring 8 provides solid support for the LED filament 7. Finally, this design also enhances the overall customizability of the filament assembly. Users can replace the LED filament 7 according to personal preferences or scenario needs, or achieve different styles of lighting effects by replacing the LED lamp fixing ring 8, providing users with more choices and flexibility.

As a further optimization solution, an inner wall of the bottom end of the lampshade 5 body is provided with a plurality of latching protrusions 512. The LED lamp fixing ring 8 is assembled with the lampshade 5 body through the latching protrusions 512. The latching protrusions 512 can ensure accurate positioning of the LED lamp fixing ring 8, prevent shaking or loosening during use, and improve the structural stability of the entire fan lamp. Moreover, no screw assembly is required, which simplifies the assembly process. Users can assemble the LED lamp fixing ring 8 and the lampshade 5 body together more quickly and conveniently, reducing the complexity of installation and improving the usability of the product.

As a further optimization solution, the LED lamp fixing ring 8 is provided with a wiring notch 81 connected to the LED lamp trough, and the inner wall of the lampshade 5 body is further provided with a wiring trough 55, one end of the wiring trough 55 is connected to the wiring notch 81, and the other end thereof extends to the installation part.

The wiring notch 81 on the LED lamp fixing ring 8 is connected to the LED lamp trough, so that cables can pass through the LED lamp fixing ring 8 more covertly, reducing the external visibility of the cables and improving the neatness of the overall appearance. Secondly, one end of the wiring trough 55 on the inner wall of the lampshade 5 body is connected to the wiring notch 81 of the LED lamp fixing ring 8, and the other end thereof extends to the installation part. This design helps to integrate the cables and extend same in an orderly manner along the wiring trough 55 to the installation part, avoiding cable clutter and reducing visual clutter. The entire wiring system is designed to make the cable layout clearer and more compact, which helps to improve the visual appeal of the entire fan lamp and also facilitates cable management and maintenance.

As a further optimization solution, the lamp head 1 assembly includes a lamp head 1, an upper cover 2 and an inner cover 3. The upper cover 2 includes a threaded head 21 and an assembling part 22. The lamp head 1 is screwed to the threaded head 21, a bottom of the assembling part 22 is provided with a plurality of buckles 221, a top of the inner cover 3 is provided with a bayonet 31, and the assembly between the upper cover 2 and the inner cover 3 is achieved through the buckles 221 and the bayonet 31.

The design of the threaded head 21 enables the lamp head 1 to be firmly connected to the upper cover 2, thereby improving the firmness of the connection. The ingenious design of the buckles 221 and the bayonet 31 makes it easier to assemble the upper cover 2 and the inner cover 3. Users can easily complete the installation of assemblies, which improves the usability of the product. The combination of the buckles 221 and the bayonet 31 provides a reliable way to connect assemblies. This design ensures that the connection between the upper cover 2 and the inner cover 3 is tight and stable, and is not prone to loosening or falling off, thereby improving the reliability of the entire lamp head 1 assembly. This solution is also expected to speed up the production and assembly process, because the connection between assemblies is easier, reducing time and costs in the production process.

As a further optimization solution, the bottom of the assembling part 22 is further provided with a plurality of positioning feet 222, the top of the inner cover 3 is provided with positioning holes 33 aligned with the positioning feet 222, and the positioning feet 222 are inserted into the corresponding positioning holes 33. The introduction of the positioning feet 222 provides additional alignment support and ensures correct positioning between the upper cover 2 and the inner cover 3, which plays a key role in ensuring that each assembly is accurately placed and aligned during production and assembly. The arrangement of the positioning holes 33 further simplifies the installation process of the assemblies. By inserting the positioning feet 222 into the corresponding positioning holes 33, users can more easily align and connect the assemblies, reducing possible errors and improving the overall assembly efficiency. This solution is also expected to increase the stability of the entire lamp head 1 assembly, and reduce possible shaking or loosening of the assembly during use, thereby further improving the reliability of the product.

As a further optimization solution, the installation part includes a first installation part 52 and a second installation part 53 that are connected in sequence from top to bottom. A plurality of first installation posts 521 are disposed in the first installation part 52, and a plurality of second installation posts 32 are disposed at a bottom of the inner cover 3. The second installation posts 32 are docked with the first installation posts 521. A surface of the inner cover 3 is provided with screw holes aligned with the second installation posts 32, and screws pass through the second installation posts 32 and the first installation posts 521 in sequence to achieve the assembly of both. By docking the first installation posts 521 in the first installation part 52 with the second installation posts 32 at the bottom of the inner cover 3, a stronger connection is provided and the stability of the entire mounting structure is enhanced. The arrangement of screw holes makes the entire installation process more precise and controllable. By passing the screws step by step, the accuracy of alignment and connection between the inner cover 3 and the installation parts is ensured, and possible assembly errors are reduced. This optimization solution not only improves the accuracy of assembly, but also helps simplify the entire assembly process. By better docking and fixing the various elements in the assembly process, production efficiency and product consistency can be improved.

As a further optimization solution, the second installation part 53 is further provided with motor positioning holes 531 internally. The brushless motor fan 6 includes a brushless motor and fan blades. A driving end of the brushless motor is connected to the fan blades, and a tail of the brushless motor is further provided with a third installation post. Screws pass through the motor positioning holes 531 and the third installation post in sequence to achieve the assembly of both.

By providing the motor positioning holes 531 in the second installation part 53, the brushless motor fan 6 can be accurately positioned, the installation accuracy of the entire fan component is improved, and possible assembly errors are reduced. Secondly, the third installation post is provided at the tail of the brushless motor and assembled with the motor positioning holes 531, increasing the stability of the entire brushless motor fan 6. This design can effectively avoid possible shaking or loosening during use, thereby improving the reliability of the product.

As a further optimization solution, a side wall of the first installation part 52 is provided with a first wire passing hole 522 aligned with the wiring trough 55, and a side wall of the inner cover 3 is also provided with a wire passing notch 34 aligned with the first wire passing hole 522.

The arrangement of the first wire passing hole 522 provides a more convenient passage for wires, allowing cables to pass through the first installation part 52 more smoothly, reducing the resistance of the cable routing, and making the entire system more stable. The arrangement of the wire passing notch 34 on the side wall of the inner cover 3 realizes the guidance and fixation of cables, so that the cables can be routed along the surface of the inner cover 3 in a more orderly manner, thereby reducing the sense of clutter and improving the tidiness of the overall appearance. This solution, by aligning the wire passing hole with the wire passing notch 34, makes cable management more precise, can better prevent cable crossovers and clutter, and improves the controllability of the overall cable layout.

As a further optimization solution, a bottom of the second installation part 53 is provided with a second wire passing hole 532, and the second wire passing hole 532 is used for electrical connection between the brushless motor and the PCB controller 4. The second wire passing hole 532 provides a dedicated channel for conveniently and orderly connecting wires between the brushless motor and the PCB controller 4, which helps simplify cable routing, reduces possible clutter, and improves overall system serviceability.

As a further optimization solution, the periphery of the second installation part 53 is connected to a reinforcing sleeve 54 through reinforcing ribs.

First, the introduction of the reinforcing sleeve 54 increases the structural strength of the entire second installation portion 53, which provides more reliable support and reduces possible deformation or shaking for supporting the assembly, that is, the brushless motor fan 6 above the installation part. The connection of the reinforcing ribs provides more structural connection points at the periphery, increasing the tightness between assemblies, which is very important for the stability of the entire assembly structure and can reduce the possibility of loosening or shaking during use.

The PCB controller 4 has a main control module, a power drive module, a wireless remote control module, an LED lamp drive module and a motor drive module built-in. The main control module is connected to the power drive module, the wireless remote control module, the LED lamp drive module and the motor drive module, respectively; and the power drive module is electrically connected to the wireless remote control module, the LED lamp drive module and the motor drive module, and implements power supply for each module. At the same time, the LED lamp drive module is electrically connected to the LED filament 7 and implements the driving of the LED filament 7. The motor drive module is electrically connected to the brushless motor to implement the driving of the brushless motor.

The fan lamp in the present application further improves user experience and convenience in function. Light brightness adjustment and fan wind speed adjustment are realized through a remote control, and the APP IoT function is equipped, providing users with a more flexible and intelligent control method. Users can easily adjust the light brightness and fan power through the remote control, providing a convenient control method, which allows users to easily adjust various parameters of the product without moving, increasing convenience of use. At the same time, the integrated APP IoT function allows users to control the product through wireless networks, by means of devices such as smart phones or tablets. Users can remotely control lights and fans through APPs anywhere, increasing the intelligence and interconnectivity of the product. The above embodiments are only descriptions of preferred embodiments of the present invention, and do not limit the scope of the present invention. Without departing from the design spirit of the present invention, various modifications and improvements made by ordinary engineers and technicians in the art to the technical solutions of the present invention shall fall within the scope of protection determined by the claims of the present invention.

What is claimed is:

1. A fan lamp, comprising: a lamp head assembly, a lampshade, a PCB controller, a brushless motor fan, and a filament assembly, wherein a top of the lampshade is provided with an installation part, the PCB controller is built into the installation part, the lamp head assembly is assembled on the installation part, the PCB controller is electrically connected to the lamp head assembly, the brushless motor fan is installed at a bottom of the installation part and electrically connected to the PCB controller, the filament assembly is assembled at an edge of a bottom end of the lampshade body and electrically connected to the PCB controller, the lampshade is a light-transmitting lampshade, the light-transmitting lampshade comprises a lampshade body, the installation part is located at a top center of the lampshade body, and a plurality of air inlets are formed in an outer side of the lampshade body.

2. The fan lamp according to claim 1, wherein the filament assembly comprises an LED filament and an LED lamp fixing ring, wherein the LED lamp fixing ring is provided with an LED lamp trough, the LED filament is assembled in the LED lamp trough, and the LED lamp fixing ring is detachably assembled at the edge of the bottom end of the lampshade body.

3. The fan lamp according to claim 2, wherein an inner wall of the bottom end of the lampshade body is provided with a plurality of latching protrusions, wherein the LED lamp fixing ring is assembled with the lampshade body through the latching protrusions.

4. The fan lamp according to claim 3, wherein the LED lamp fixing ring is provided with a wiring notch connected to the LED lamp trough, the inner wall of the lampshade body is further provided with a wiring trough, one end of the wiring trough is connected to the wiring notch, and the other end thereof extends to the installation part.

5. The fan lamp according to claim 1, wherein the lamp head assembly comprises a lamp head, an upper cover and an inner cover, wherein the upper cover comprises a threaded head and an assembling part, wherein the lamp head is screwed to the threaded head, a bottom of the assembling part is provided with a plurality of buckles, a top of the inner cover is provided with a bayonet, an assembly is achieved through the buckles and the bayonet, the bottom of the assembling part is further provided with a plurality of positioning feet, the top of the inner cover is provided with positioning holes aligned with the positioning feet, and the positioning feet are inserted into the corresponding positioning holes.

6. The fan lamp according to claim 5, wherein the installation part comprises a first installation part and a second installation part that are connected in sequence from top to bottom, wherein a plurality of first installation posts are disposed in the first installation part, a plurality of second installation posts are disposed at a bottom of the inner cover, the second installation posts are docked with the first installation posts, a surface of the inner cover is provided with screw holes aligned with the second installation posts, and screws pass through the second installation posts and the first installation posts in sequence to achieve the assembly of both.

7. The fan lamp according to claim 6, wherein the second installation part is further provided with motor positioning holes internally, wherein the brushless motor fan comprises a brushless motor and fan blades, wherein a driving end of the brushless motor is connected to the fan blades, a tail of the brushless motor is further provided with a third installation post, and screws pass through the motor positioning holes and the third installation post in sequence to achieve the assembly of both.

8. The fan lamp according to claim 6, wherein a side wall of the first installation part is provided with a first wire passing hole aligned with the wiring trough, and a side wall of the inner cover is also provided with a wire passing notch aligned with the first wire passing hole; and a bottom of the second installation part is provided with a second wire passing hole.

9. The fan light according to claim 8, wherein the periphery of the second installation part is connected to a reinforcing sleeve through reinforcing ribs.

* * * * *